United States Patent
Tao (10) Patent No.: US 8,619,983 B2
(45) Date of Patent: Dec. 31, 2013

(54) DIGITAL TV CONDITIONAL ACCESS SYSTEM AND METHOD OF USING THE SAME FOR TRANSMITTING AND RECEIVING DIGITAL DATA

(75) Inventor: Shenghua Tao, Jinan (CN)

(73) Assignee: Shandong Taixin Electronics Co., Ltd, Jinan (CN)

( * ) Notice: Subject to any disclaimer, the term of this patent is extended or adjusted under 35 U.S.C. 154(b) by 208 days.

(21) Appl. No.: 12/827,050

(22) Filed: Jun. 30, 2010

(65) Prior Publication Data

US 2010/0266123 A1   Oct. 21, 2010

Related U.S. Application Data

(63) Continuation of application No. PCT/CN2008/002145, filed on Dec. 31, 2008.

(30) Foreign Application Priority Data

Jan. 3, 2008   (CN) .......................... 2008 1 0013701

(51) Int. Cl.
*H04N 7/167* (2011.01)
*H04L 29/00* (2006.01)

(52) U.S. Cl.
USPC .................................. 380/211; 726/4; 725/25

(58) Field of Classification Search
None
See application file for complete search history.

(56) References Cited

U.S. PATENT DOCUMENTS

| | | | |
|---|---|---|---|
| 6,393,562 B1 | 5/2002 | Maillard | |
| 6,466,671 B1 | 10/2002 | Maillard et al. | |
| 8,509,444 B2 * | 8/2013 | Nishimoto et al. | 380/277 |
| 2003/0188164 A1 * | 10/2003 | Okimoto et al. | 713/172 |
| 2004/0068541 A1 | 4/2004 | Bayassi et al. | |
| 2004/0139312 A1 * | 7/2004 | Medvinsky | 713/150 |
| 2005/0066355 A1 * | 3/2005 | Cromer et al. | 725/31 |
| 2008/0222676 A1 * | 9/2008 | Yun et al. | 725/38 |
| 2009/0097659 A1 * | 4/2009 | Candelore | 380/278 |
| 2009/0262679 A1 * | 10/2009 | Kim et al. | 370/328 |

FOREIGN PATENT DOCUMENTS

| | | |
|---|---|---|
| CN | 1549595 A | 11/2004 |
| CN | 101222608 A | 7/2008 |
| CN | 201142735 Y | 10/2008 |
| EP | 1 182 874 A1 | 2/2002 |
| FR | 2 902 585 A1 | 12/2007 |

OTHER PUBLICATIONS

Office Action dated Jul. 11, 2011 issued in European Patent Application No. 08 871 850.7-1241.

* cited by examiner

*Primary Examiner* — Hadi Armouche
(74) *Attorney, Agent, or Firm* — Oliff & Berridge, PLC (57) ABSTRACT

A digital TV conditional access system having an authentication module, a conditional access front-end module, and a receiver module. The authentication module communicates bidirectionally with and authenticates the receiver module to generate a unique ID number and authentication information, the ID number and the authentication information being recorded to a data base. The conditional access front-end module communicates bidirectionally with the data base, collects information of the receiver module from the data base, encrypts entitlement management message of the receiver module, and transmits the encrypted entitlement management message to the receiver module by an addressing mode. The conditional access front-end module further includes an entitlement control message generator, and the receiver module receives a scrambled program with the help of the ID number and the authentication information. A method of using the digital TV conditional access system for transmitting and receiving encrypted digital data is also provided.

9 Claims, 6 Drawing Sheets

DIGITAL TV CONDITIONAL ACCESS SYSTEM AND METHOD OF USING THE SAME FOR TRANSMITTING AND RECEIVING DIGITAL DATA

CROSS-REFERENCE TO RELATED APPLICATIONS

This application is a continuation of International Patent Application No. PCT/CN2008/002145 with an international filing date of Dec. 31, 2008, designating the United States, now pending, and further claims priority benefits to Chinese Patent Application No. 200810013701.3 filed Jan. 3, 2008. The contents of all of the aforementioned applications, including any intervening amendments thereto, are incorporated herein by reference.

BACKGROUND OF THE INVENTION

1. Field of the Invention

The invention relates to the field of digital TV (comprising cable TV, satellite TV, Terrestrial TV, and IPTV) and mobile multimedia, and more particularly to a digital TV conditional access system and a method of using the same for transmitting and receiving encrypted digital data.

2. Description of the Related Art

A conditional access (CA) system is used to control a subscriber's receipt of digital data, i.e., the subscriber can only receive the entitled digital television programs, including audio, video, and data, so that the operators can obtain profits from the subscribers via entitlement control and entitlement management.

In digital TV systems, the operators use a CA system to encrypt and transmit TV programs, and only the entitled subscribers can receive the transmissions. Aside from paid TV programs, the CA system can provide other value-added services comprising video on demand, information services, and internet. Thus, the CA system increases income for operators and becomes a basic and most important part of a digital TV system.

However, with the rapid development of computer and digital technologies, conventional CA systems have the following disadvantages:

1. Low Security

Conventional CA systems of digital TV are mainly based on Europe's DVB standard, which has been in place more than 10 years. Its working principle is described below. A front-end encrypted digital TV signal has a pair of periodically changeable secret keys, which was called control words (CW). The CA system encrypts and transmits the CW to the decryption apparatus of a receiver of digital TV content for decryption. Thus, the CW is obtained and transmitted to a descrambler which audio and video data streams are obtained and played by a play module.

At the time the standard was developed, considerations focused on how to transmit the CW safely to a receiver, but the decryption and diffusion of CW over shared by network technology was not expected. Therefore, the current situation, which includes highly developed network technology, poses, serious system loopholes that may be utilized by pirates, resulting in huge losses to digital TV operators.

Figure 1:
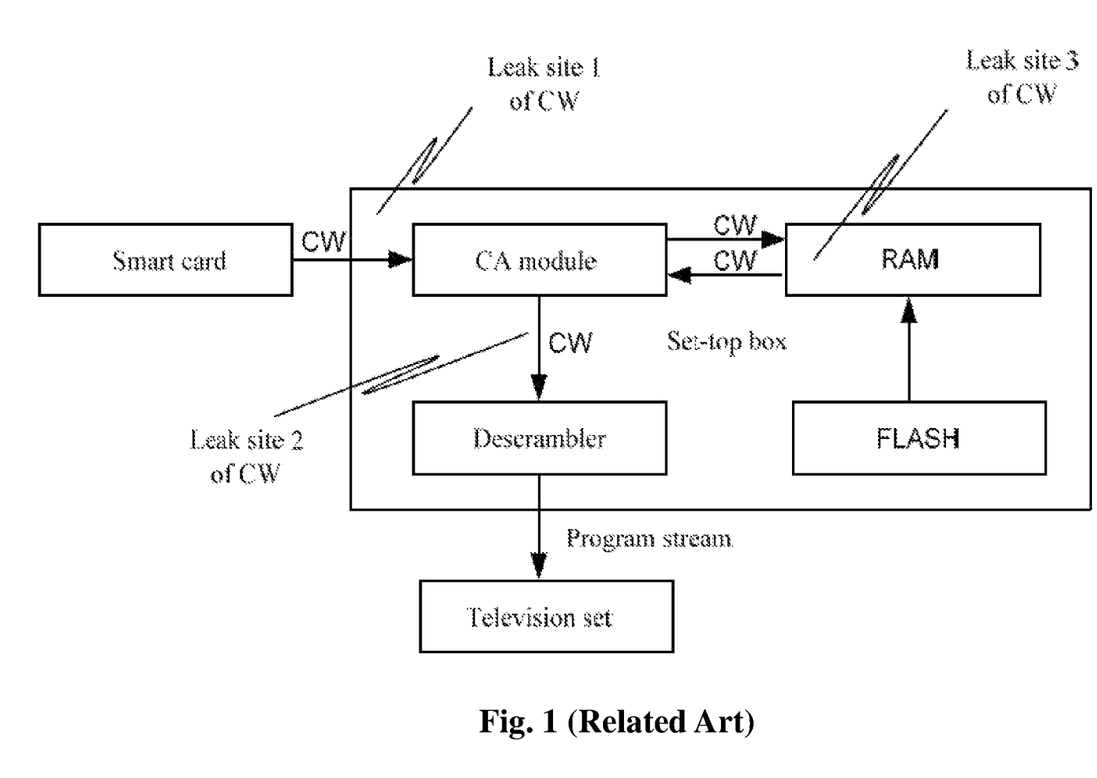
FIG. 1 is a schematic diagram of security leak of conditional access system uses a smart card in the related art art.

The receiver of conventional CA system is generally a smart card. The decryption algorithm is saved in the smart card. Encrypted data are transmitted to the smart card from which the CW is obtained. The CW is transmitted to a descrambler via a receiver CA module. The CA module, as a separate component, is embedded in the software framework of a set-top box. The technology has security risks because CW can be intercepted at many points as shown in FIG. 1.

The first leak site is a communication point between the smart card and the receiver.

The second leak site is between the CA module and the descrambler.

The third leak site is the communication between the CA module and the memory (RAM).

No CA system with a CA module can avoid the first and second leak sites. To obtain the CW from the third leak site is very difficult and requires high cost. Thus, the first and second leak sites bring more security problems than the third leak site. The CW can be obtained from the first leak site by a simple device and can be obtained from the second leak site by separating the CA module from the set-top box. Either method is easily achieved existing computer technology and results in a leak in the CA. The relevant corresponding code may be readily found on the internet.

Every CA company has two secrets of the utmost importance: one is the CA algorithm and the other is the CA module. With the exception of network sharing, unless the CA algorithm is disclosed, the CA system is safe because the decryption of the CA algorithm is very difficult. However, the decryption of the CA module is very easy, resulting in the collapse of CA systems that use smart cards.

Based on the previous decryption of CA systems that use smart cards, the service life of the CA module is much longer than that of the CA algorithm. Often, the CA algorithm may be re-encrypted many times, but the CA module is unchanging. Thus, in the current situation of the ubiquity of highly developed network technology, it is more beneficial for pirates to encrypt the CA module.

For conventional CA systems that use smart cards, communication between the smart card and the set-top box is basically fixed. Any changes (upgrades) are minimal. For CA systems that have issued a large number of cards, changes are much more difficult to enact. Thus, even if the CA supplier has identified the leak site for the CW, the CA supplier almost has no methods for upgrading the CA security, which has a tremendous effect on the competitiveness of CA operators. Conventional CA systems that use a smart card include a set-top box in which are embedded many corresponding CA modules. The chip of the set-top box may vary, and the CA modules are embedded mainly by the set-top box manufacturer. Thus, the CA module data easily diffuse and may be leaked. Even if no leakage occurs, an ordinary hacker can successfully analyze the CA module from the program memory of the set-top box. Once analyzed, the data can be used for a long time. Thus, conventional CA systems that with smart cards have serious security risks.

2. Poor Universality

To improve the security index, conventional CA systems have many privacy mechanisms in place. Each CA supplier encrypts its own data as securely as possible using its own proprietary algorithms. Therefore, the set-top box manufacturers cannot integrate the many CA modules into a single set-top box, which makes the set-top box non-universal.

Furthermore, it is very difficult for CA suppliers to provide a special CA system for each CA operator. The CA algorithms provided by a single CA supplier are identical across operators. If a CA system used by an operator is decrypted, all other operators will be affected.

3. High Cost

In conventional CA receivers, a decryption control unit comprises at least a smart card interface circuit, a smart card reader device, and a special smart card, which greatly increase the receiving costs for digital TV, waste resources, and limit the popularization of digital TV.

SUMMARY OF THE INVENTION

In view of the above-described problems, it is one objective of the invention to provide a digital TV conditional access (CA) system that has high security, low cost, and good universality.

It is another objective of the invention to provide a method of using the digital TV CA system to transmit and receive encrypted digital data.

To achieve the above objectives, in accordance with one embodiment of the invention, there is provided a digital TV CA system comprising an authentication module, a CA front-end module, and a receiver module, wherein the authentication module communicates bidirectionally with and authenticates the receiver module to generate a unique ID number and authentication information, the ID number and the authentication information are recorded in a data base; the CA front-end module communicates bidirectionally with the data base, collects the receiver module information from the data base, encrypts the entitlement management message from the receiver module, and transmits the encrypted entitlement management message to the receiver module by using an addressing mode; the CA front-end module further comprises an entitlement control message generator and connects to an external download port; and the receiver module receives a scrambled program with the help of the ID number and the authentication information.

In a class of this embodiment, the authentication module comprises a main receiver chip, a security chip, and a memory chip, all of which cooperate with the data base and have unique identities and data areas that can be written once only and cannot be erased; the main chip includes a ROM comprising the data area; and, after authentication, the unique ID number and authentication information are saved in the hardware of the receiver and cannot be copied.

In a class of this embodiment, the CA front-end module comprises a scrambler, an entitlement control message generator, an entitlement management message generator, and a subscriber management system; the scrambler receives, processes, and transmits audio, video, data, and encrypted information generated by the entitlement control message generator and by the entitlement management message generator; the subscriber management system controls the entitlement management message generator and communicates bidirectionally with the data base; the data base communicates bidirectionally with the entitlement management message generator.

In a class of this embodiment, the receiver module comprises a demultiplexing module, CPU, a descrambler, a play module, a descrambling control module, and a memory module; the demultiplexing module receives an encrypted transmission stream to obtain two data streams, one is a scrambled audio and video data stream that is transmitted by a data channel to the descrambler for descrambling, the other is an entitlement control message with an entitlement management message; the entitlement control message and the entitlement management message are processed by the CPU and are transmitted to the descrambling control module to yield a control word (CW); the descrambler utilizes the CW to decrypt the encrypted audio and video data stream; the resultant decrypted audio and video data stream is transmitted to the play module for play.

The CA system can easily update the CA system algorithm of the receiver module and the CA front-end module. By updating the CA system algorithm periodically, the security of the system may be significantly enhanced.

In accordance with another embodiment of the invention, there is provided a method of using the digital TV CA system for transmitting and receiving of encrypted digital data. The method comprises a) An authentication process: the step focuses on the systemic authentication of the receiver upon production, match examination between hardware units, and registration of effective information of the receiver, and comprises: matching a main chip with a security chip by an algorithm and recording both unit's information and common information, matching the main chip with a memory chip by an algorithm and recording each unit's information and common information, matching the security chip with the memory chip by an algorithm and recording each unit's information and common information, transmitting all of the information by means of the receiver to an authentication server where the data are examined, recording successfully examined data to the data base and allocating a unique ID number and a security code to the receiver, the ID number functioning as a basis for conditional addressing, and the security code functioning as a basis for checking the authenticity of the receiver;

b) A CA front-end process: this process inquires after the ID number from the data base using a subscriber management system after receiving instructions from an operator. If they exist, the instructions are transmitted to the CA front-end module, which generates data according to the information from the receiver as a secret key for the encrypted entitlement management messages, generates an encrypted entitlement management message using an entitlement management message generator, and enters a digital TV network via a scrambler. Meanwhile, an entitlement control message is generated using an entitlement control message generator, and the entitlement control message enters the digital TV network;

c) A CA terminal-end process: the process demultiplexes digital signals by the receiver to generate scrambled audio and video data that are transmitted to the descrambler directly, an entitlement control message, and an entitlement management message. The process filters the entitlement control message in memory to generate effective information and an entitlement message; and d) Updating of the CA system algorithm: when a CA system algorithm in use is decrypted or must be updated due to security considerations, the process is carried out, comprising: transmitting a new CA system algorithm via a multiplexer, scrambler, and modulator from the CA front-end module to a digital TV network, receiving the new CA system algorithm by the receiver module, and updating an old CA system algorithm with the new CA system algorithm.

In a class of this embodiment, in step c), the receiver first examines the match between the main chip and the security chip, the match between the main chip and the memory chip, and the match between the security chip and the memory chip; upon success, an effective entitlement management message is filtered out according to the ID of the receiver, and a secret key corresponding to the entitlement management message is calculated according to the matched information. The entitlement management message is decrypted to generate an entitlement for decrypting the entitlement control message and another secret key; the entitlement control message is decrypted to generate a CW that is transmitted to the descrambler; the descrambler descrambles audio and video data according to the CW; the descrambled audio and video data are transmitted to the play module for play.

In a class of this embodiment, in step d), the new CA system algorithm does not update the old CA system algorithm in use. Instead, it is saved in the receiver so that the receiver includes two types of CA system algorithm. The receiver selects a CA system algorithm from the two types of CA system algorithms according to the CA system algorithm used by the CA front-end module to receive the scrambled audio and video data. In addition, to prevent the CA system algorithm from illegal use, the legality of the receiver module is examined so that an illegal receiver module cannot use the updated CA system algorithm.

Conventional DVB standards have been in place for more than ten years, and relevant front-end and back-end equipment occupies a large market share. Modifying the standard means for updating equipment will incur a heavy price. The invention solves the security risks associated with conventional CA under the existing DVB standard, and the system has good universality. In the invention, the CA module and application programs are integrated into one module, the CA algorithm and CA module are not separate. Therefore, no information about the CW may be obtained from outside the receiver module, which ensures the security of the system. In addition, the system involves no smart cards, thereby removing the necessity for a smart card interface circuit, a smart card reader device, and a special smart card. The CA programs are thereby simplified, which greatly decreases the receiver cost.

The advantages of the invention are summarized below. The system involves no smart card, thereby removing the necessity for a smart card interface circuit, a smart card reader device, and a special smart card. The CA programs are thereby simplified, which greatly decreases the receiver cost. The invention totally solves the security problem that arose from leak site 1 for CW in the related art, from front-end to the terminal-end. Because the CA module and the application programs are integrated, the leak site 2 for CW in the related art is not present. Although the CW can be shared through the deceit of chip design companies, in doing so, the companies would be taking great business and legal risks. In the invention, obtaining the CW from the leak site 3 in the related art requires decryption of all programs in the receiver module, so there is no business value in doing so. Because almost all existing chips support the implementation of a downloaded code, the encryption algorithm of the CA system can be updated by a new dynamic code transmitted from the CA front end. If the updating time is less than the time required for decryption, the decryption of the encryption algorithm becomes meaningless, which improves the security of the system. In addition, because the receiver module supports the implementation of a downloaded code, in different regions, the receiver with the same software and hardware can selectively download and implement programs from different digital TV operators, which improves the universality between the receiver and the CA system.

Thus, the invention overcomes several disadvantages of conventional CA systems, such as low security, high cost, and poor universality, and provides a digital TV CA system with high security, low cost, good universality, simple structure, and convenient practice.

BRIEF DESCRIPTION OF THE DRAWINGS

The invention is described hereinbelow with reference to accompanying drawings, in which.

Legend: 1. Data base; 2. Conditional access front-end module; 3. Authentication module; 4. Receiver module; 5. Main chip; 6. Security chip; 7. Memory chip; 8. Scrambler; 9. Entitlement control message generator; 10. Entitlement management message generator (EMM); 11. Subscriber management system (SMS); 12. Descrambler; 13. Demultiplexing module; 14. CPU; 15. Play module; 16. Descrambling control module; 17. Memory module.

DETAILED DESCRIPTION OF THE EMBODIMENTS

For further illustrating the invention, experiments detailing a digital TV conditional access system and a method of using the same for transmitting and receiving encrypted digital data are described below. It should be noted that the following examples are intended to describe but not to limit the invention.

Figure 2:
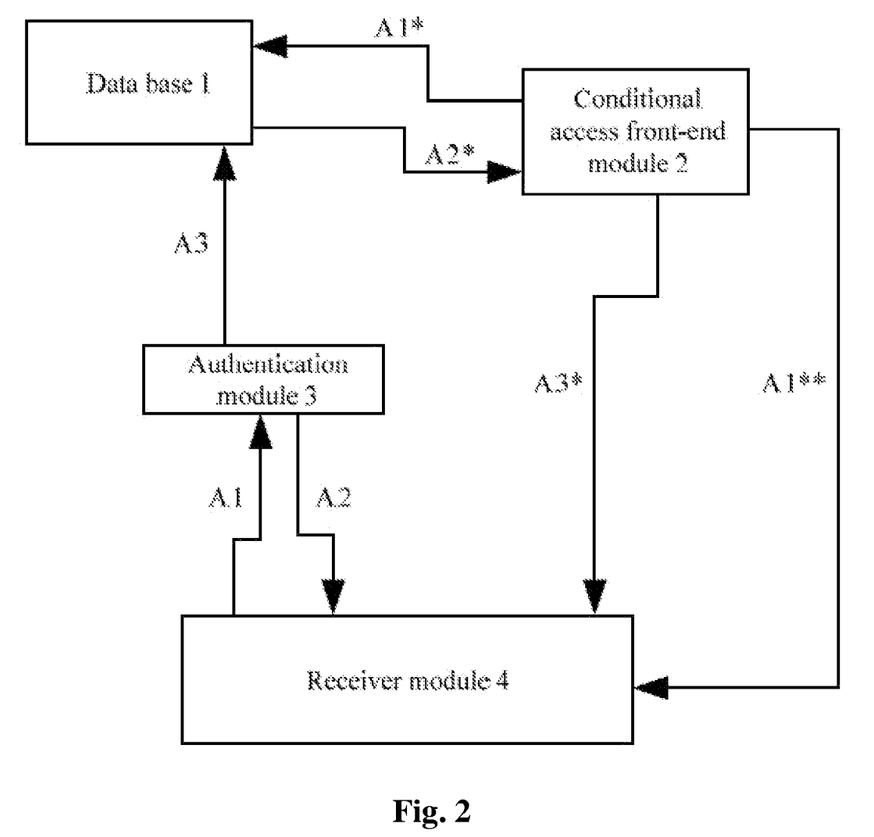
FIG. 2 is an overall flow chart of a conditional access system according to one embodiment of the invention.

As shown in FIG. 2, it is an overall flow chart of a conditional access system. The system comprises an authentication module 3, a conditional access front-end module 2, and a receiver module 4. The authentication module 3 communicates bidirectionally with and authenticates the receiver module 4 to generate a unique ID number and authentication information (A1-A2). The ID number and the authentication information of the receiver module 4 are recorded to data base 1 (A3). The conditional access front-end module 2 communicates bidirectionally with the data base 1, collects information on the receiver module from the data base 1, encrypts entitlement management message of the receiver module (A1*-A2*), and transmits the encrypted entitlement management message to the receiver module 4 by an addressing mode (A3*); the conditional access front-end module 2 further comprises an ECM generator; and the receiver module 4 receives a scrambled program with the help of ID number, authentication information, and softwares. The receiver module can update the conditional access system algorithm according to the conditional access front-end module (A1**).

Figure 3:
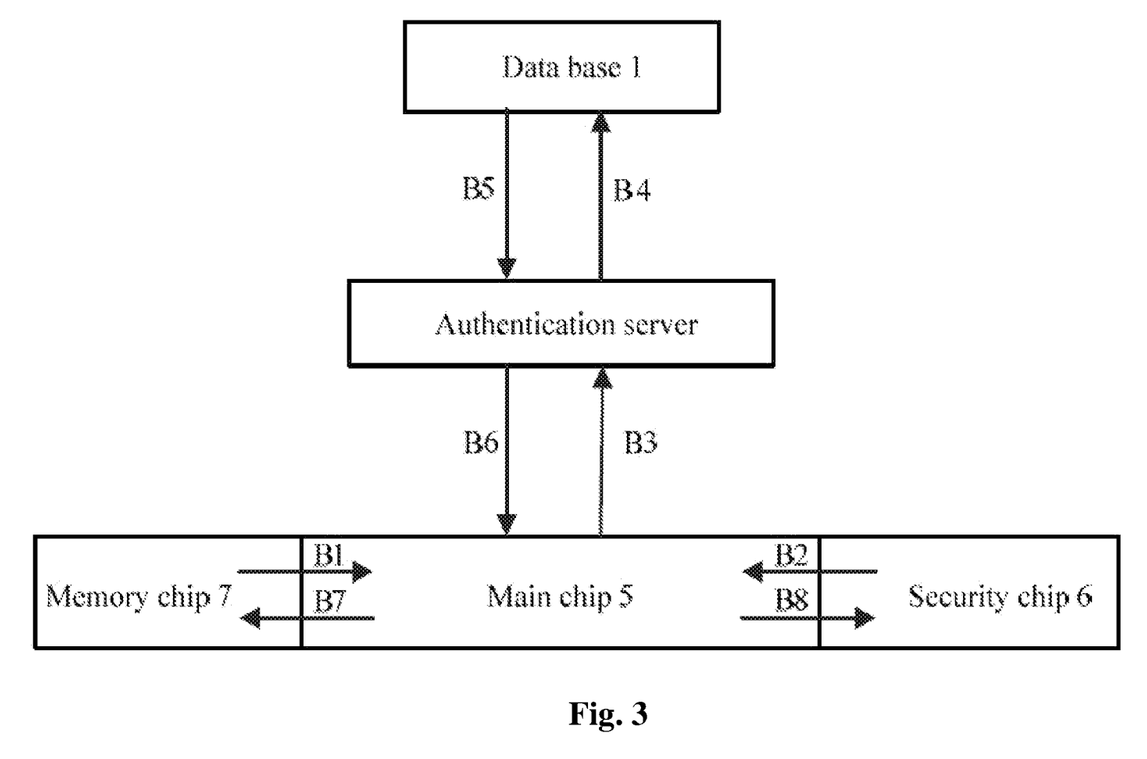
FIG. 3 is a flow chart of authentication according to one embodiment of the invention.

As shown in FIG. 3, it is a flow chart of authentication. The process comprises matching a main chip 5 with a memory chip 7 by an algorithm and recording each other's information and common information (B1, B7); matching the main chip 5 with a security chip 6 by an algorithm and recording each other's information and common information (B2, B8); matching the security chip 6 with the memory chip 7 by an algorithm and recording each other's information and common information (B1, B2); transmitting all the information by the receiver to an authentication server (B3), where the data is examined; recording successfully-examined data to the data base (B4) and allocating the unique ID number {ID} and a security code (B5-B6) to the receiver. The ID number and the security code are encrypted and saved in the memory chip 7 and the security chip 6 (B7, B8). The ID number functions as a basis for conditional addressing, and the security code functions as a basis for checking the authenticity of the receiver.

Figure 4:
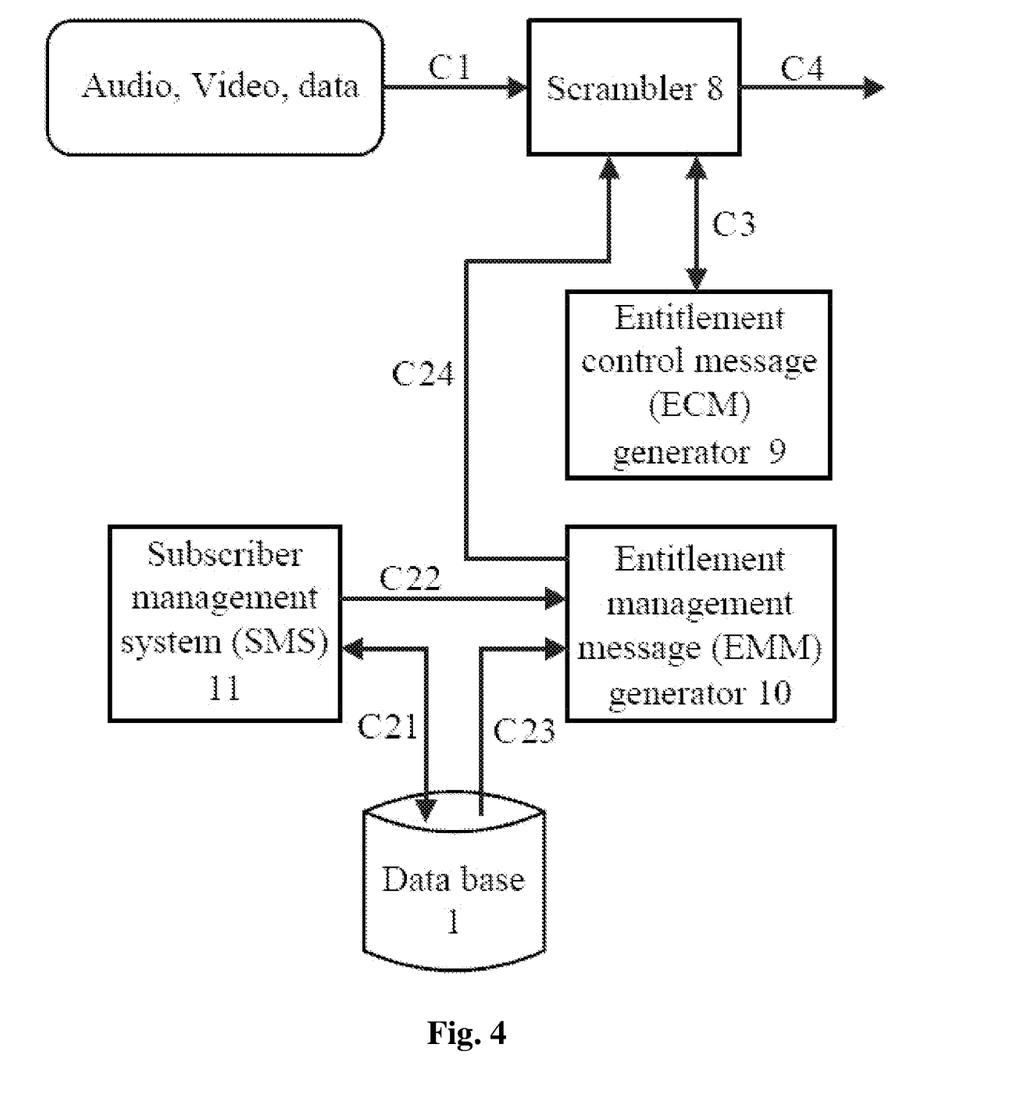
FIG. 4 is a flow chart of a conditional access front end module according to one embodiment of the invention.

As shown in FIG. 4, it is a flow chart of a conditional access front end module 2. The process comprises inquiring the ID number from the data base by a subscriber management system 11 after receiving instruction from an operator (C21), if it is existing, transmitting the instruction to the conditional access front-end module 2 (C22), generating a data according to the information of the receiver as a secret key of encrypted entitlement management message (C23), generating encrypted entitlement management message by an entitlement management message generator 10, and entering a digital TV network (C4) together with audio and video data (C1) via a scrambler 8, meanwhile, generating entitlement control message by an entitlement control message generator 9 and entering the digital TV network (C3).

Figure 5:
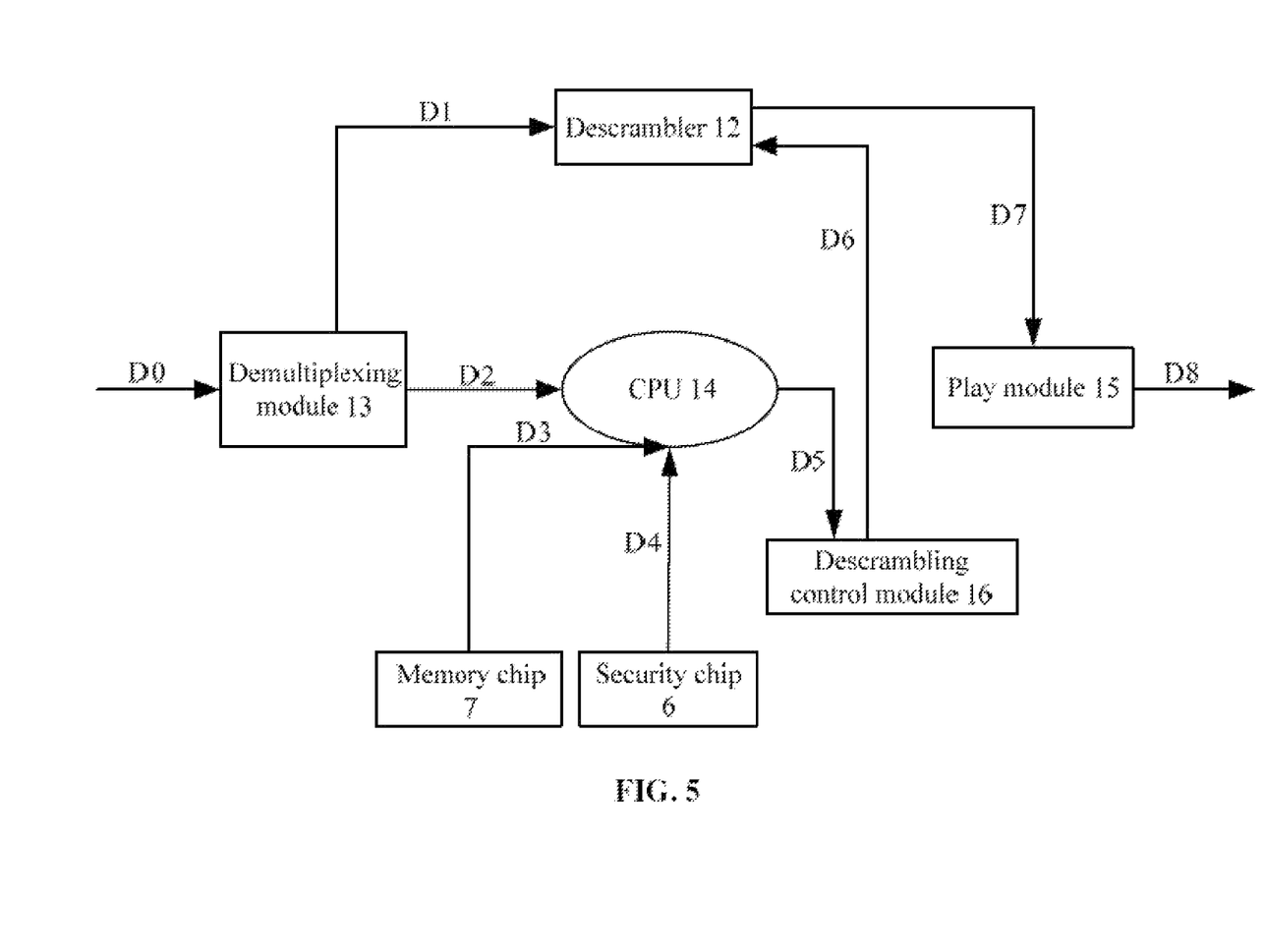
FIG. 5 is a flow chart of a receiver module according to one embodiment of the invention.

As shown in FIG. 5, it is a flow chart of a receiver module. The process comprises demultiplexing digital signals (D0) by a demultiplexing module 13 of the receiver to generate audio and video data which is scrambled by the scrambler 8 and transmitted directly to a descrambling control module 16 (D1) and entitlement control message and entitlement management message which are transmitted to CPU 14 connected to the memory chip 7 and the security chip 6, filtering the entitlement control message in a memory to generate entitlement message (D2-D5). After entitlement message and secret key to decrypt the entitlement control message are obtained, the entitlement control message is decrypted to yield a CW which is transmitted to a descrambler 12 (D6). The descrambler 12 descrambles audio and video data according to the CW, and the descrambled audio and video data is transmitted to play module 15 for playing (D7-D8).

Figure 6:
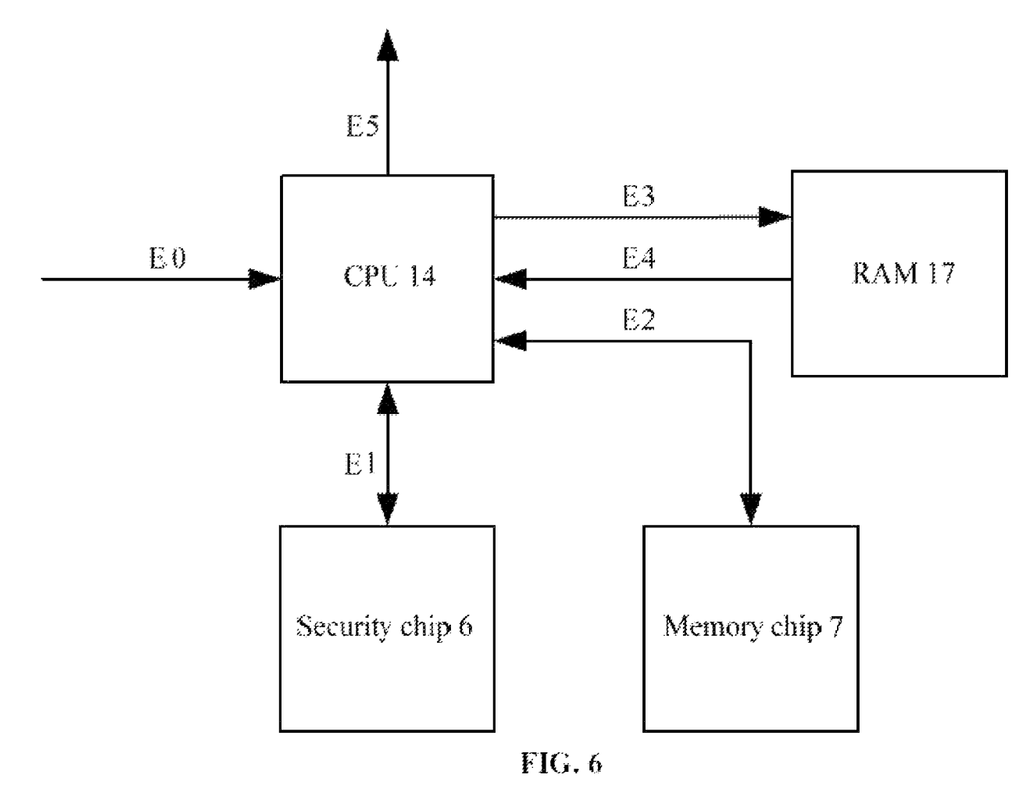
FIG. 6 is a detail flow chart of a conditional access processor according to one embodiment of the invention.

As shown in FIG. 6, it is a detail flow chart of a conditional access processor by which an effective entitlement control message is filtered out and decrypted in a memory module 17. The process comprises communicating CPU 14 bidirectionally with the memory module 17, the security chip 6, and the memory chip 7 respectively, examining the match of the main chip 5 with the security chip 6, the match of the main chip 5 with the memory chip 7, and the match of the security chip 6 with the memory chip 7 (E1-E2), if unmatchable, terminate working; if matchable, filtering out effective EMM (E3) according to the identity of the receiver, calculating a secret key of the entitlement management message according to matched information (E4), and decrypting the entitlement management message for further processing (E5).

A method of using the digital TV conditional access system for transmitting and receiving encrypted digital data, comprising a) authentication process: the step focuses on the systemic authentication of the receiver upon production thereof, the match examination between hardwares and the registration of effective information of the receiver, which comprising: matching the main chip with the security chip by an algorithm and recording each other's information and common information; matching the main chip with the memory chip by an algorithm and recording each other's information and common information; matching the security chip with the memory chip by an algorithm and each other's information and common information; transmitting all the information by the receiver to an authentication server where the data is examined; recording successfully-examined data to the data base and allocating the unique ID number and the security code to the receiver, the ID number functioning as a basis for conditional addressing, and the security code functioning as a basis for checking the authenticity of the receiver;

b) conditional access front-end process: inquiring the ID number from the data base by the subscriber management system after receiving instruction from an operator, if it is existing, transmitting the instruction to the conditional access front-end module, generating a data according to the information of the receiver as a secret key of encrypted entitlement management message, generating encrypted entitlement management message by an EMM generator, and entering a digital TV network via the scrambler, meanwhile generating ECM by the entitlement control message generator and entering the digital TV network;

c) conditional access terminal-end process: demultiplexing digital signals by the receiver to generate scrambled audio and video data which are transmitted to the descrambler directly and entitlement control message and entitlement management message, filtering the entitlement control message in a memory to generate effective information and entitlement message; and d) updating conditional access system algorithm: when a conditional access system algorithm in using is decrypted or need to be updated due to security consideration, the process is carried out, comprising: transmitting a new conditional access system algorithm via a multiplexer, the scrambler, and a modulator from the conditional access front-end module to a digital TV network, receiving the new conditional access system algorithm by the receiver module, and updating an old conditional access system algorithm with the new conditional access system algorithm.

Specifically, in step c), the receiver firstly examines the match of the main chip with the security chip, the match of the main chip with the memory chip, and the match of the security chip with the memory chip; upon success, an effective entitlement management message is filtered out according to the ID of the receiver, and a secret key of the entitlement management message is calculated according to the matched information; the entitlement management message is decrypted to generate an entitlement, to decrypt the entitlement control message and another secret key; the entitlement control message is decrypted to generate a CW, which is transmitted to the descrambler; the descrambler descrambles audio and video data according to the CW; the descrambled audio and video data are transmitted to the play module for playing.

Specifically, in step d), the new conditional access system algorithm does not update the old conditional access system algorithm in using, but is saved in the receiver so that the receiver has two kinds of conditional access system algorithm. The receiver selects a conditional access system algorithm from the two kinds of conditional access system algorithm according to the conditional access system algorithm used by the conditional access front-end module to receive scrambled audio and video data. In addition, to prevent the conditional access system algorithm from using illegally, the legality of the receiver module is examined so that illegal receiver module cannot use updated conditional access system algorithm.

The conditional access system algorithm of the invention may be any algorithm in line with the DVB standards.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A digital TV conditional access system comprising an authentication server, a conditional access front-end module, and a receiver module, wherein said authentication server, upon production thereof, communicates bidirectionally with and authenticates said receiver module to generate a unique ID number of the receiver module and authentication information of the receiver module, said ID number and said authentication information being recorded to a data base, said ID number functioning as a basis for conditional addressing, wherein the receiver module comprises a main chip, a security chip, and a memory chip, said main chip is matched with said security chip by an algorithm and each other's information and common information are recorded: said main chip is matched with said memory chip by an algorithm and each other's information and common information are recorded: said security chip is matched with said memory chip by an algorithm and each other's information and common information are recorded;

said conditional access front-end module communicates bidirectionally with said data base, collects the authentication information of said receiver module from said data base, encrypts entitlement management message of said receiver module, and transmits said entitlement management message encrypted with the authentication information to said receiver module by an addressing mode; said conditional access front-end module further comprises an entitlement control message generator and connects to an external download port; and said receiver module receives a scrambled program with the help of said ID number and said authentication information, wherein said receiver firstly examines the match of said main chip with said security chip, the match of said main chip with said memory chip, and the match of said security chip with said memory chip; upon success, an effective entitlement management message is filtered out according to ID of said receiver, and a secret key of said entitlement management message is calculated according to the matched information; said entitlement management message is decrypted, and corresponding processes are performed according to the result of the decryption.

2. The digital TV conditional access system of claim 1, wherein each of said main chip, said security chip and said memory chip cooperates with said data base and has a unique identity and a data area which is written once only and cannot be erased; said main chip has a ROM comprising said data area; and after authentication, said unique ID number and authentication information are saved in a hardware of said receiver and cannot be copied.

3. The digital TV conditional access system of claim 1, wherein said conditional access front-end module comprises a scrambler, said entitlement control message generator, an entitlement management message generator, and a subscriber management system; said scrambler receives, processes, and transmits audio, video, data, and encrypted information generated by said entitlement control message generator and by said entitlement management message generator; said subscriber management system controls said entitlement management message generator and communicates bidirectionally with said data base; and said data base communicates bidirectionally with said entitlement management message generator.

4. The digital TV conditional access system of claim 1, wherein said receiver module comprises a demultiplexing module, CPU, a descrambler, a play module, a descrambling control module, and a memory module; said demultiplexing module receives an encrypted transmission stream and obtains two data streams, one is scrambled audio and video data stream which is transmitted by a data channel to said descrambler for descrambling, the other is entitlement control message and entitlement management message; said entitlement control message and said entitlement management message are processed by said CPU and transmitted to said descrambling control module to yield a control word; said descrambler utilizes said control word to decrypt said encrypted audio and video data stream; and the resultant decrypted audio and video data stream is transmitted to said play module for playing.

5. A method of using the digital TV conditional access system of claim 1 for transmitting and receiving encrypted digital data, comprising a) authentication process: the step focuses on the systemic authentication of said receiver upon production thereof, the match examination between hardwares, and the registration of effective information of said receiver, comprising: matching a main chip with a security chip by an algorithm and recording each other's information and common information; matching said main chip with a memory chip by an algorithm and recording each other's information and common information; matching said security chip with said memory chip by an algorithm and recording each other's information and common information; transmitting all the information by said receiver to an authentication server where data is examined; recording successfully-examined data to said data base and allocating said unique ID number and a security code to said receiver, said ID number functioning as a basis for conditional addressing, and said security code functioning as a basis for checking the authenticity of the machine;

b) conditional access front-end process: inquiring said ID number from said data base by a subscriber management system after receiving instruction from an operator, if it is existing, transmitting the instruction to said conditional access front-end module, generating a data according to the information of said receiver as a secret key of encrypted entitlement management message, generating encrypted entitlement management message by an entitlement management message generator, and entering a digital TV network via said scrambler, meanwhile, generating entitlement control message by an entitlement control message generator and entering the digital TV network;

c) conditional access terminal-end process: demultiplexing digital signals by said receiver to generate scrambled audio and video data which is transmitted to said descrambler directly and entitlement control message and entitlement management message, filtering said entitlement control message in a memory to generate effective information and entitlement message; and d) updating conditional access system algorithm: when a conditional access system algorithm in use is decrypted or need to be updated due to security consideration, the process is carried out, comprising: transmitting a new conditional access system algorithm via a multiplexer, said scrambler, and a modulator from said conditional access front-end module to a digital TV network, receiving said new conditional access system algorithm by said receiver module, and updating an old conditional access system algorithm with said new conditional access system algorithm.

6. The method of claim 5, wherein in step c), said receiver firstly examines the match of said main chip with said security chip, the match of said main chip with said memory chip, and the match of said security chip with said memory chip; upon success, an effective entitlement management message is filtered out according to ID of said receiver, and a secret key of said entitlement management message is calculated according to the matched information; said entitlement management message is decrypted to generate an entitlement to decrypt said entitlement control message and another secret key; said entitlement control message is decrypted to generate a control word, which is transmitted to said descrambler; said descrambler descrambles audio and video data according to said control word; said descrambled audio and video data is transmitted to said play module for playing.

7. The method of claim 5, wherein in step d), said new conditional access system algorithm does not update said old conditional access system algorithm in use, but is saved in said receiver so that said receiver has two kinds of conditional access system algorithms; said receiver selects a conditional access system algorithm from the two kinds of conditional access system algorithms according to the conditional access system algorithm used by said conditional access front-end module to receive scrambled audio and video data.

8. The method of claim 5, wherein in step d), to prevent said conditional access system algorithm from using illegally, the legality of said receiver module is examined so that illegal receiver module cannot use updated conditional access system algorithm.

9. The digital TV conditional access system of claim 1, said ID number including manufacture information of the receiver module, said authentication information including hardware information of the receiver module.

\* \* \* \* \*